United States Patent [19]
English

[11] Patent Number: 5,233,914
[45] Date of Patent: Aug. 10, 1993

[54] IN-CAR COFFEE MAKER

[76] Inventor: Philip H. English, 0109 Ptarmigon Ct., Avon, Colo. 81620

[21] Appl. No.: 739,311

[22] Filed: Aug. 1, 1991

[51] Int. Cl.⁵ ............................................. A47J 31/22
[52] U.S. Cl. ...................................... 99/282; 99/307; 99/316; 99/312
[58] Field of Search .................. 99/279, 295, 280, 281, 99/282, 283, 306, 307, 304, 305, 316, 312; 248/181, 188.2, 346, 678; 426/433

[56] References Cited

U.S. PATENT DOCUMENTS

| | | | |
|---|---|---|---|
| 2,661,015 | 12/1953 | Allred et al. | 137/353 |
| 3,179,035 | 4/1965 | Lockett | 99/305 |
| 3,231,713 | 1/1966 | Menuto | 219/202 |
| 3,684,860 | 8/1972 | Snyder | 99/329 R |
| 4,068,961 | 1/1978 | Ebner et al. | 248/181 |
| 4,121,508 | 10/1978 | Hartkorn | 99/306 |
| 4,143,589 | 3/1979 | Weber | 99/282 |
| 4,151,790 | 5/1979 | Spirk | 99/281 |
| 4,262,585 | 4/1981 | Leuschner et al. | 392/471 |
| 4,382,402 | 5/1983 | Alvarez | 99/307 |
| 4,384,512 | 5/1983 | Keith | 99/281 |
| 4,659,053 | 4/1987 | Holley et al. | 248/181 |
| 4,662,271 | 5/1987 | Woltermann | 99/295 |
| 4,713,526 | 12/1987 | Smit | 99/307 |
| 4,875,408 | 10/1989 | McGee | 99/283 |
| 4,974,801 | 12/1990 | Pulsifier | 248/181 |
| 4,999,470 | 3/1991 | Fuchs, Jr. | 99/306 |

Primary Examiner—Harvey C. Hornsby
Assistant Examiner—Reginald L. Alexander
Attorney, Agent, or Firm—Oldham, Oldham & Wilson, Co.

[57] ABSTRACT

The In-Car Coffee Maker allows the driver of a motor vehicle to brew a cup or other single portion of brewed beverage without taking attention from the road. The device is stabilized by an anchored base. There is a rotatable holder clamp to level the coffee maker on an uneven floor or other surface of a motor vehicle, and an interlock mechanism prevents commencement of the brewing cycle unless the drinking cup is applied in proper position adjacent the coffee maker. A showerhead configuration above a brewing chamber allows heated water to dispersably contact a prepackaged filter containing beverage precursor particles. A thermostat control causes automatic shut-off when a single portion has brewed. A water reservoir is removable and resealable. Splash guard features are provided in the drinking cup for safety.

16 Claims, 10 Drawing Sheets

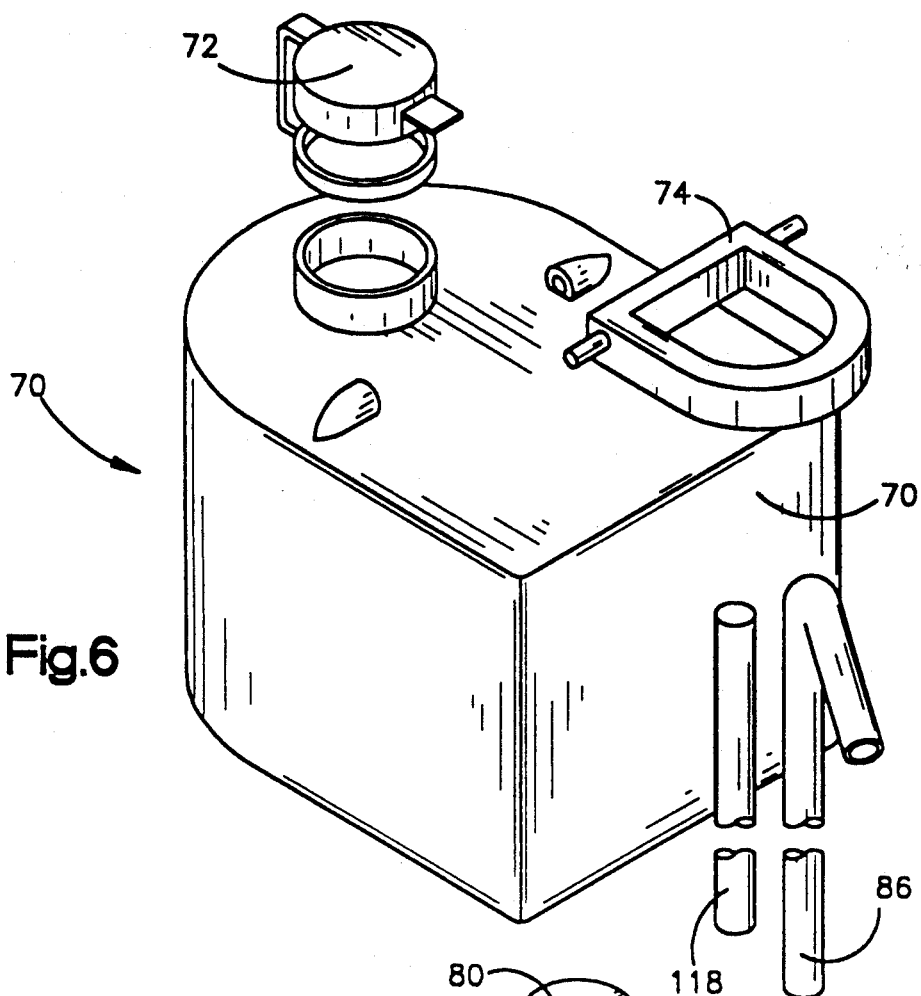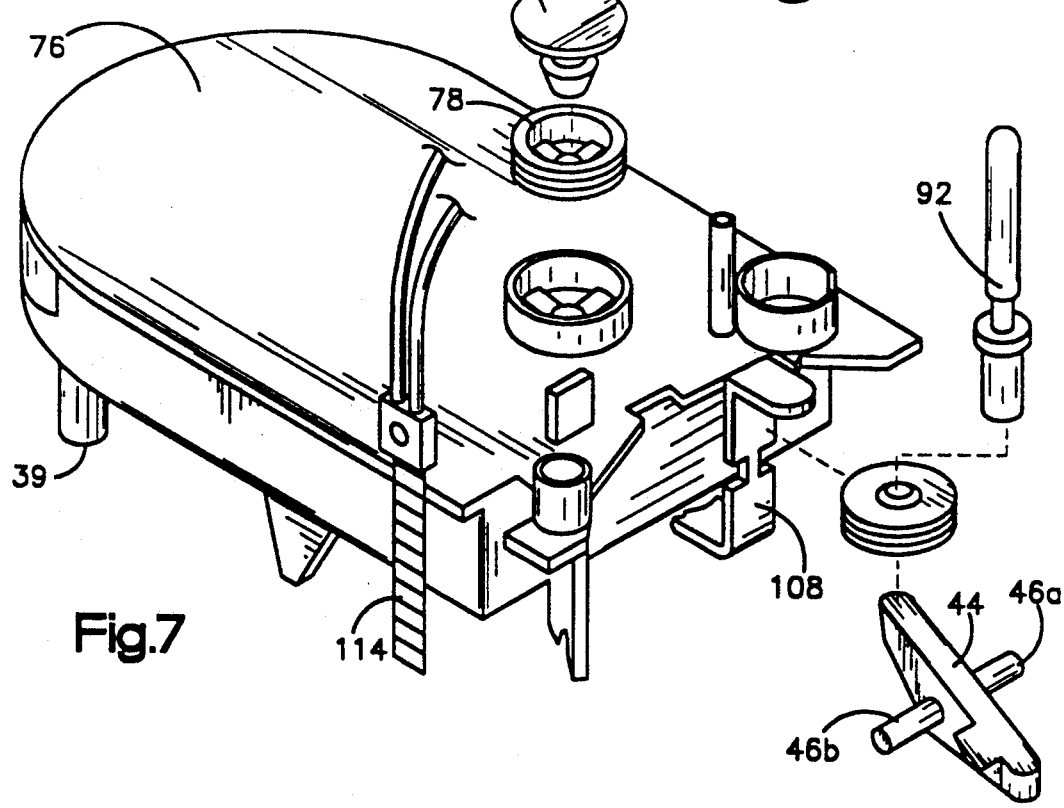

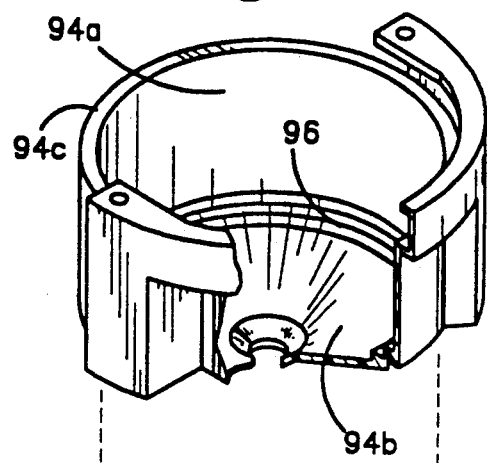
Fig.8
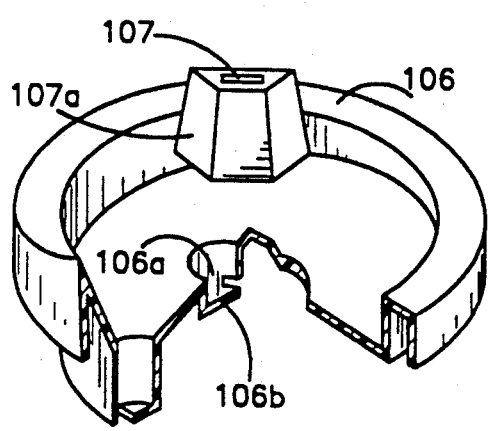
Fig.9
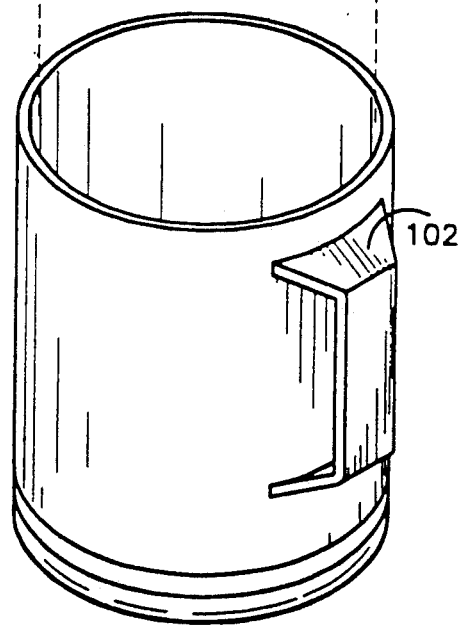
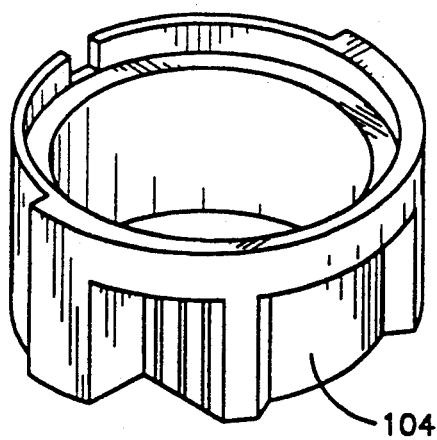
Fig.10

IN-CAR COFFEE MAKER

FIELD OF THE INVENTION

The present invention relates to an improved, compact and lightweight device for brewing coffee or other beverages in motor vehicles. More specifically, the device is designed to be first anchored and leveled, and then to automatically brew a cup or other individual portion when activated. Safety features include an interlock mechanism, so that the brew cycle cannot commence unless a splash proof drinking cup is properly applied against the main body of the coffee maker to help avoid spillage and driver distraction.

BACKGROUND OF THE INVENTION

Numerous brewing devices for use in motor vehicles have been disclosed in the past. Some of the former devices are completely portable as that disclosed in U.S. Pat. No. 4,382,402, to Donald E. Alvarez, wherein a portable coffee maker in a moving vehicle brews one cup of coffee at a time to avoid distracting the driver.

Other prior art prior beverage makers for motor vehicles, had components which were integral to the motor vehicle itself. For example, in U.S. Pat. No. 2,661,015, to W. R. Allred, et al, a hot water tank is disposed in the engine compartment of the vehicle and a water heating coil within the tank is connected into the hot water system of the vehicle.

U.S. Pat. No. 3,231,713 to A. Menuto, likewise discloses an apparatus for heating water and the like for domestic purposes in automotive vehicles. The water supply and heating tanks are located within the engine compartment and there is a faucet and sink in the passenger compartment.

U.S. Pat. No. 4,151,790 to David J. Spirk, discloses a coffee maker having a built-in reservoir and thermostatically controlled shut-off means to shut off power to the coffee maker when the heating chamber is at an excessive temperature.

In the patent to Spirk, U.S. Pat. No. 4,151,790, the water reservoir is not removable, thereby requiring that the entire coffee maker be turned upside down to drain the reservoir. The Spirk invention does not have a cup interlock to ensure that the drinking cup is in place as the cycle activates. Also, the Spirk patent '790, does not have anchoring or leveling means or an LED display to signal the user at the end of the cycle to remove the brewed cup.

U.S. Pat. No. 4,875,408, to McGee discloses a beverage maker for use in vehicles having a brewing chamber made functional by temperature sensitive shape-memory alloys for raising and lowering the brewing chamber. There is a disposable brew basket formed of a filter-like pouch or bag containing ground, instant or granular coffee, or other beverage making material, sealed within the brew basket by cover sheets of vapor impermeable material. And a drinking cup is provided with a removable cover actuatable by a movable cup handle, and when the cup is inserted into the beverage maker system the cup handle opens the cover and simultaneously starts a water heater and controls flow of heated water to the beverage brewing chamber.

But the disclosures contained in each of the foregoing patents have been found to be unsatisfactory in many respects, among others, that the prior coffee makers were not adapted to be anchored within a motor vehicle to avoid the effects of motion and vibration of the motor vehicle, were not adapted to be leveled upon an uneven floor of a motor vehicle and were not sufficiently sturdy.

Additionally, the water reservoir or other water container in the prior art automotive beverage makers were not capable of being removed from the brewing device for cleaning or refilling. Also, many in-car brewers were not fully automated, were too large and not relatively sizeable or compact for beneficial use in a motor vehicle, and the components were too expensive and not commercially feasible.

In view of various drawbacks and deficiencies in the prior art coffee makers, it is a general object of the present invention to provide a anchoring means to stabilize the coffee maker on the floor of a motor vehicle.

A further object is to provide a means to level the coffee maker upon an uneven surface or floor of a motor vehicle.

Another object of the invention is to provide a coffee maker having a removable and resealable water reservoir, whereby the reservoir can be removed from the device, cleaned and refilled, and replaced in the coffee maker, the resealability thereby preventing spillage of water due to motion or vibration of the motor vehicle.

Another object of the invention is to automatically heat a volume of liquid substantially equal to a single portion of a brewed beverage and dispense it to a brewing chamber, where the hot liquid dispersably flows through a prepackaged filter containing particles of coffee or other beverage precursor, whereupon the brewed beverage flows by gravity from the brewing chamber to a drinking cup.

An important objective of this invention is to provide an interlock mechanism associated with a drinking cup, so that if the drinking cup is not in proper position adjacent the coffee maker, then the brewing cycle cannot commence.

Yet another object of the invention is to provide a signaling means to notify the user the brewing cycle concluded and the brewed cup may be removed.

Another object of the invention is to provide a main body cover adapted to hold the brewed cup of coffee and to also act as a holder for coffee filters.

These and other objects and advantages of the present invention will be made more apparent as the specification proceeds.

SUMMARY OF THE INVENTION

The improved coffee maker of this invention includes a hollow main body, with removable cover and bottom. In the preferred embodiment, the coffee maker bottom is slidably installed upon a holder and then firmly clamped in position upon the holder. The holder interconnects with and is rotatably mounted upon a base, whereby the coffee maker body can be leveled in relation to the base. Carpet anchors are positioned around the periphery of the base for anchoring the base, thereby effectively anchoring the coffee maker.

A water container or water reservoir can be removed from the coffee maker for cleaning and refilling and then reinserted in the hollow main body and resealed. An electromechanical mechanism is included to time, and thereby limit, the volume of water flow from the reservoir to a cup or other individual or single portion.

A mechanical interlock mechanism is incorporated in the coffee brewing system, so that the brew cycle cannot commence unless a drinking cup is applied against the coffee maker to move a lockout lever. A temperature sensitive device associated with a heater tube is included. The temperature sensitive device may be electronic, such as a thermistor, or electromechanical, such as a thermostat, and is adapted to break the electrical circuit and automatically shut off the system when a volume equal to a cup or other single portion has been heated. A button light which, preferably, is a Light Emitting Diode, LED, remains on during the brewing cycle, and goes off when the brew cycle is concluded thereby notifying the user to remove a drinking cup containing brewed beverage. The drinking cup includes antisplash features to further enhance user safety.

BRIEF DESCRIPTION OF THE DRAWINGS

Reference is now made to the accompanying drawings wherein:

FIG. 6 is a three quarter elevation of the water reservoir, reservoir valve and seat;

FIG. 7 is an elevational view of the measuring chamber, pushrod, hot water tube, vent tube and pivot arm;

FIG. 8 is a partial sectional view of the filter cup;

FIG. 9 is an elevational view of the drinking cup and partial sectional view of the splashproof lid;

FIG. 10 is an elevational view of the drip cup;

FIG. 11A is a three quarter elevation of the main body of the coffee maker;

FIG. 11B is an elevational view of the button light, button light cover, button light body and actuator stem;

DETAILED DESCRIPTION OF THE INVENTION

Figure 1:
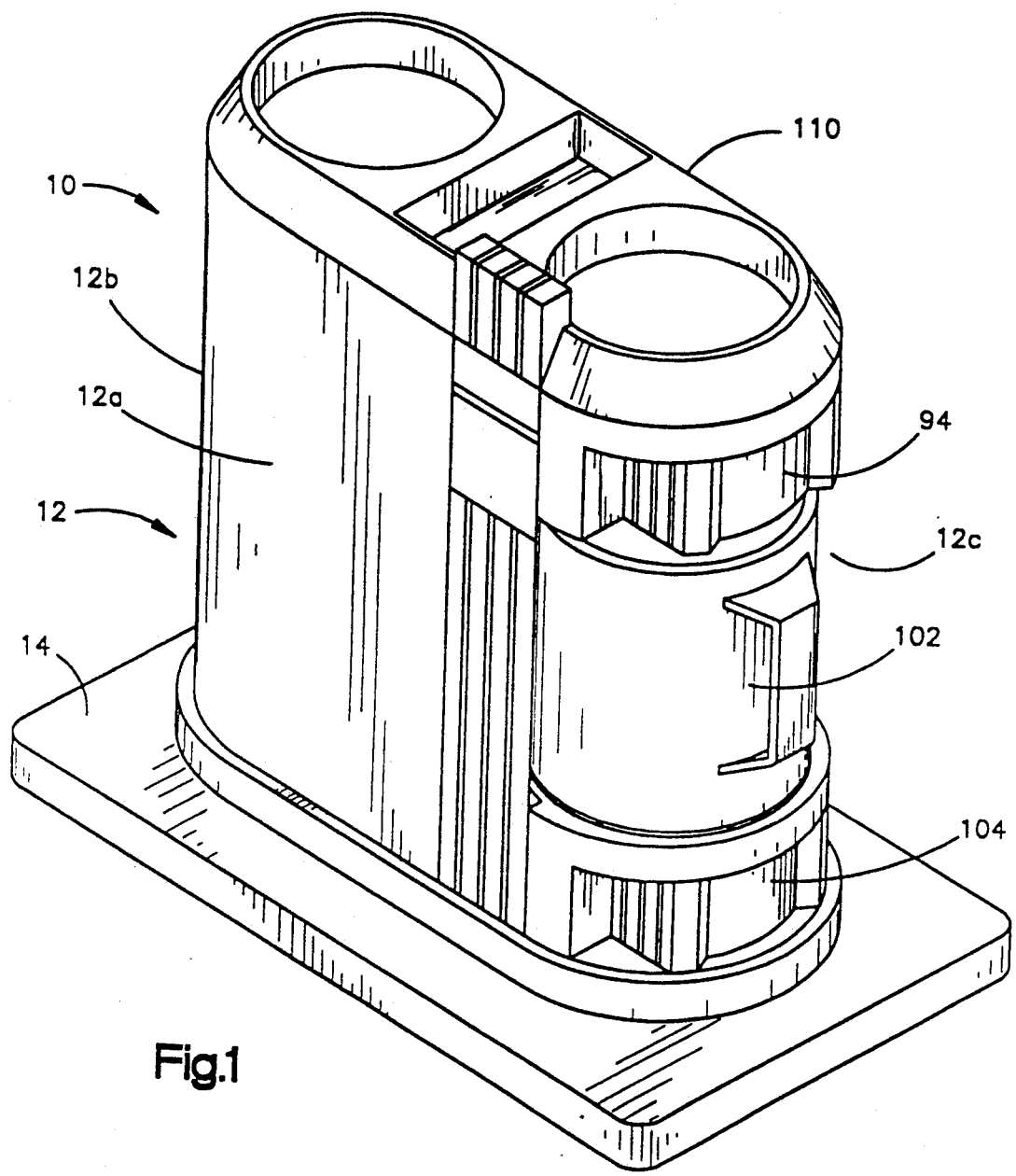
FIG. 1 is a three-quarter elevation of the coffee maker device with a filter cup, drinking cup and drip cup in operative alignment.

The coffee maker of this invention, depicted by numeral 10 in FIG. 1, has a hollow main body 12 with the general shape of a right elliptical cylinder with flattened sidewalls 12A and two ends 12B, 12C. The device is equipped with a mounting base 14 for stabilizing the coffee maker 10 within a moving vehicle by anchoring the base to carpeting of a motor vehicle. In the preferred embodiment, the mounting base 14 for the coffee maker 10 has an essentially rectangular shape and is sized somewhat larger than the footprint of the coffee maker itself.

The device is relatively downsized for adaption to use in motor vehicles. Thus the mounting base may have length between 9 to 10.5 inches, width between 5 to 6.5 inches, but preferably the dimensions of the base are 10×6 inches. The coffee maker body is relatively downsized and compact, having length and width dimensions between 9×4.25 inches, with a height measuring approximately 8.25 inches.

Figure 2:
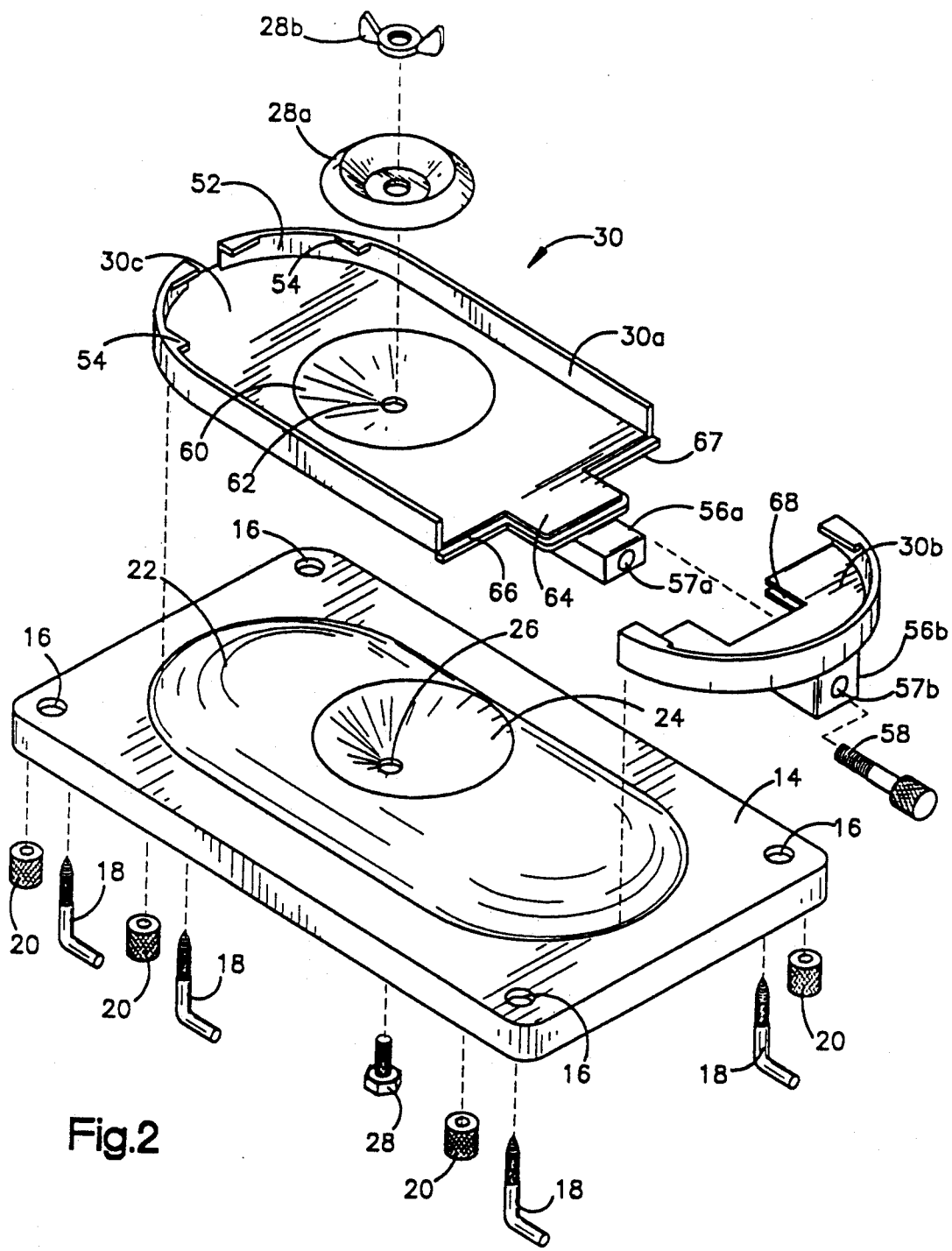
FIG. 2 is a detailed elevational view of the base, anchors, the holder and components for adjustably mounting the holder upon the base.

Referring now to FIG. 2, at each of the four corners of the mounting base 14, there are a plurality openings or apertures 16, for threaded carpet anchors 18 insertable through the openings 16 in the base 14 and fastened thereon by means of thumb nuts 20, comprised of nylon or a metallic material, but preferably comprised of polycarb material. The carpet anchors 18 may be plastic or metallic, preferably steel, and they preferably have an L-shape, with the leg being threaded and the foot of each L-shaped carpet anchor ending in a point for insertion into and through carpeting or other surface in a motor vehicle.

Referring further to FIG. 2, there is an elliptically shaped raised portion 22 which rises from the periphery towards the central region of the base 14, and there is a centrally located hemispherical depression 24 within the area of in the raised portion. An opening 26 in the center of the hemispherical depression 24 is provided for receipt of a bolt 28 therethrough.

Referring again to FIG. 2, the elliptically shaped holder 30 has two parts 30A, 30B, a first holding part 30A and a second clamping part 30B. The holder 30 has a flat surface or floor 30C and ridge 52 rises essentially perpendicular to the floor around an elliptical periphery of both holder parts 30A, 30B. The two holder parts are capable of being separated and then fitted together and tightened against one another to effect a clamping action.

The ridge 52 which rises around the periphery of the holder 30 has a plurality of retaining edges 54 projecting inwardly and essentially perpendicular to the ridge 52.

The common side of the first holding part 30A and second clamping part 30B preferably include a means for interconnecting the two parts which may be a tongue and groove arrangement or the two parts can be connected together by any other means known in the art. A pair opposed blocks 56A, 56B are provided under both the first holding part 30A and second clamping part 30B and the blocks 56A, 56B are disposed lengthwise to the long access of the elliptically shaped holder 30 with the block under the second clamping part 56B having a bore 57B therethrough for receiving a thumb screw 58 and the bore 57A in opposing block 56A under the first holding part 30A being threaded so that the thumb screw 58 can be threadably tightened to squeeze the second clamping part 30B tightly against the first holding part 30A. A protruding lip 36 around the elliptically shaped bottom 32 of the coffee maker 10 likewise has an elliptical shape and is adapted to be fitted within the elliptically shaped holder and restrained by the ridge and retaining edges of the holder 30. When the thumb screw 58 connecting the two holder parts 30A, 30B is tightened, the holder 30 will more securely restrain the bottom 32 of the coffee maker body 12 between the first holding part 30A and second clamping part 30B.

The hemispherical depression of the holder 30 is adapted to be fitted into and rotatably mounted upon the corresponding hemispherical depression 24 in the mounting base 14. The aperture 62 of the first holder part 30A coincides with a similarly centralized aperture 26 in a base 14. However, the aperture of the holder 30 is, preferably, somewhat larger than the corresponding aperture 14B of the base 14, so that when the mounting base 14 and holder 30 are positioned together by means of a bolt 28 insertable through said centralized apertures 26,62 which bolt 28 is held in place with a washer 28A and wing nut 28B, the holder 30 may be rotated somewhat in relation to the base 14 to level the coffee maker before the wing nut 28B is tightened.

The peripheral ridge 52 and plurality of retaining edges 54 of the holder 30 are adapted to receive, grip and hold a lip 36 portion which protrudes around a bottom 32 of the main body of the coffee maker. When the first holder part 30A and holder clamp 30B are drawn apart or expanded, the coffee maker bottom 32 is fitted therein, and then the first holder part 30A and holder clamp 30B can be tightened over the bottom 32 of the main body 12 of the coffee maker 10 within the first holder part and second clamping part 30B. To facilitate that holding clamping or action, the edge 66 of the first holder part 30A opposed to the second clamping part 30B has a centralized leg 64 protruding from that edge 66, and the entire edge 66 of the first holder part 30A, including the leg portion 64, has a protruding edge 67 adapted for insertion within a grooved edge 68 of the holder clamp 30B.

Figure 2A:
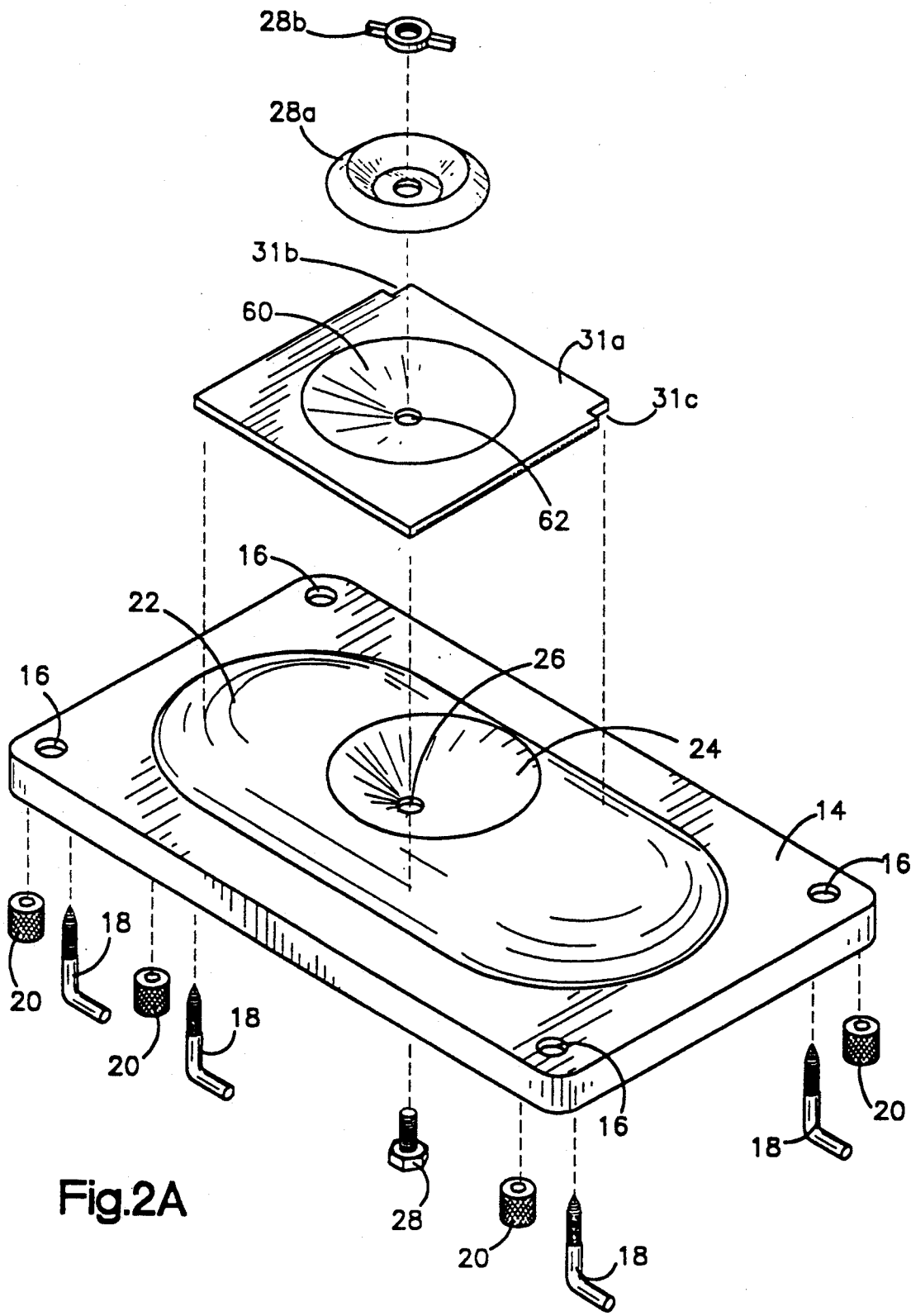
FIG. 2A depicts the mounting base again and the preferred embodiment of the holder formed as a leveling plate.

In the preferred embodiment, the holder is formed as a leveling plate 31A, depicted in FIG. 2A, having generally square shape except for two portions cut off from two adjacent corners on a side of the leveling plate to form offsets. In this embodiment, there is a grooved section 33 formed on the lower surface of the bottom 32 of the coffee maker FIG. 3 and FIG. 3A. The sides of the grooved section 33 are spaced apart to receive the leveling plate. The grooved section 33 on the lower surface of the coffee maker bottom 32 is further provided with retaining projections 33C,33D protruding inward at both sides of the grooved Section 33. A first end of the grooved Section 33 receives the leveling plate 31A which slidably interfits the groove 33 and retaining projections 33C,33D and the second end of the groove 33 is effectively blocked by stop blocks 33A,33B which corresponding with the offsets 31B,31C of the leveling plate 31A.

The leveling plate 31A is designed to slide into the groove in the bottom portion 32 of the coffee maker main body 12, with the offsets 31B,31C of the leveling plate 31A abutting the corresponding square stops 33A,33B positioned at the second end of the grooved section in the bottom portion 32. The bottom 32 of the coffee maker is further provided with a semicircular latch 33e rotatably fastened, by means of a screw 33F mounted in hole 33G, to the bottom 32 adjacent the open end of the grooved section 33, so that when the leveling plate 31A has been slidably positioned in the groove 33 the semicircular latch 33E rotates to closed position by gravity to retain the bottom 32 of coffee maker in position on the leveling plate 31A.

The leveling plate 31A is rotatably mounted upon the base 14 and the leveling plate 31A and base 14 are constructed to enable leveling the coffee maker 10 relative to the uneven floor of a motor vehicle, whereby the device can be anchored and then leveled upon such a floor.

Figure 3:
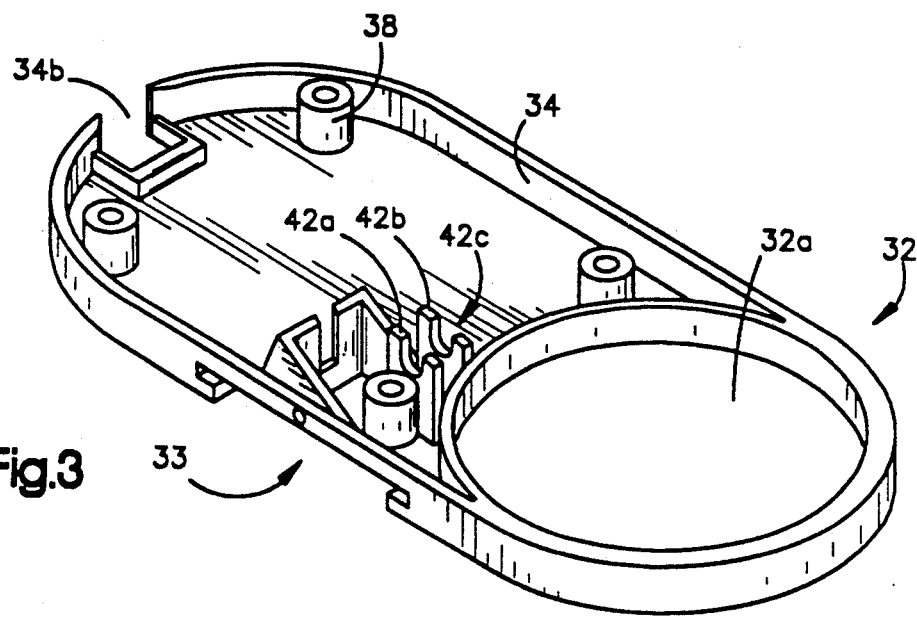
FIG. 3 is a elevational view depicting the upper surface of the bottom of the coffee maker.
Figure 3A:
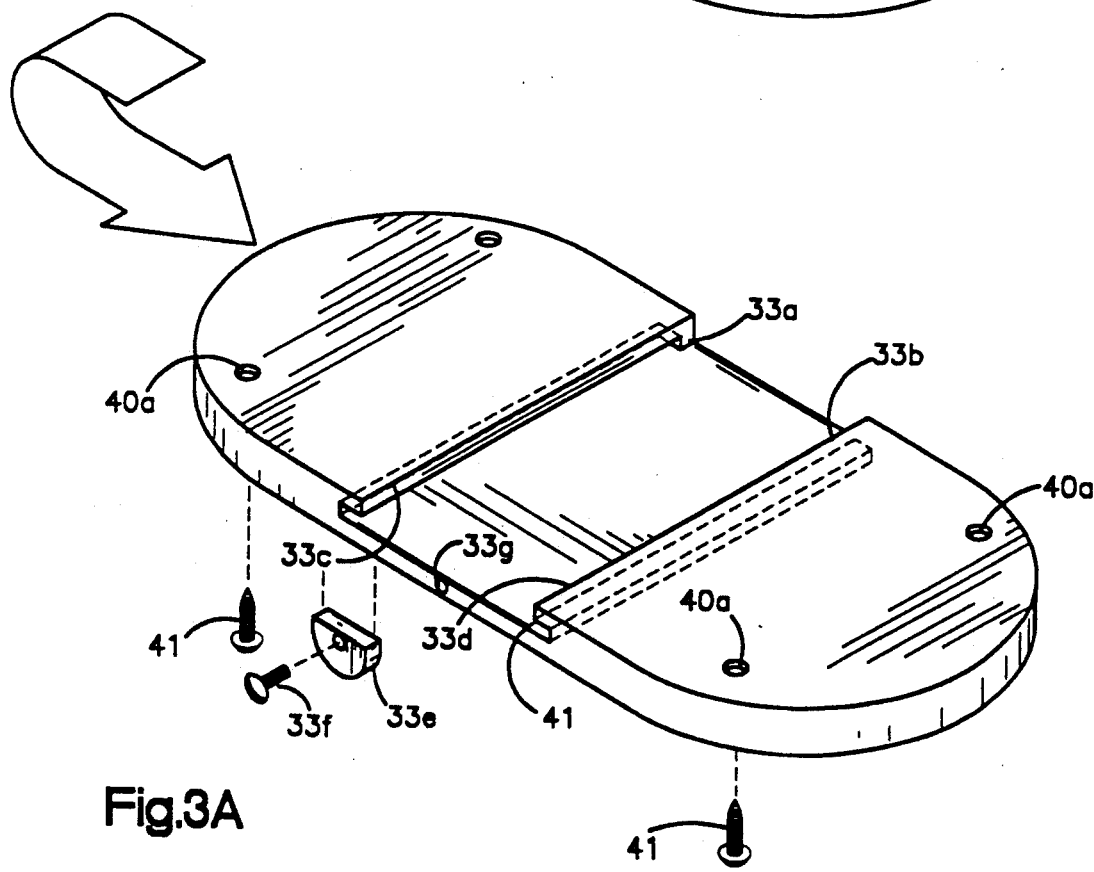
FIG. 3A is an elevational view depicting the groove in the lower surface of the coffee maker bottom.
Figure 4:
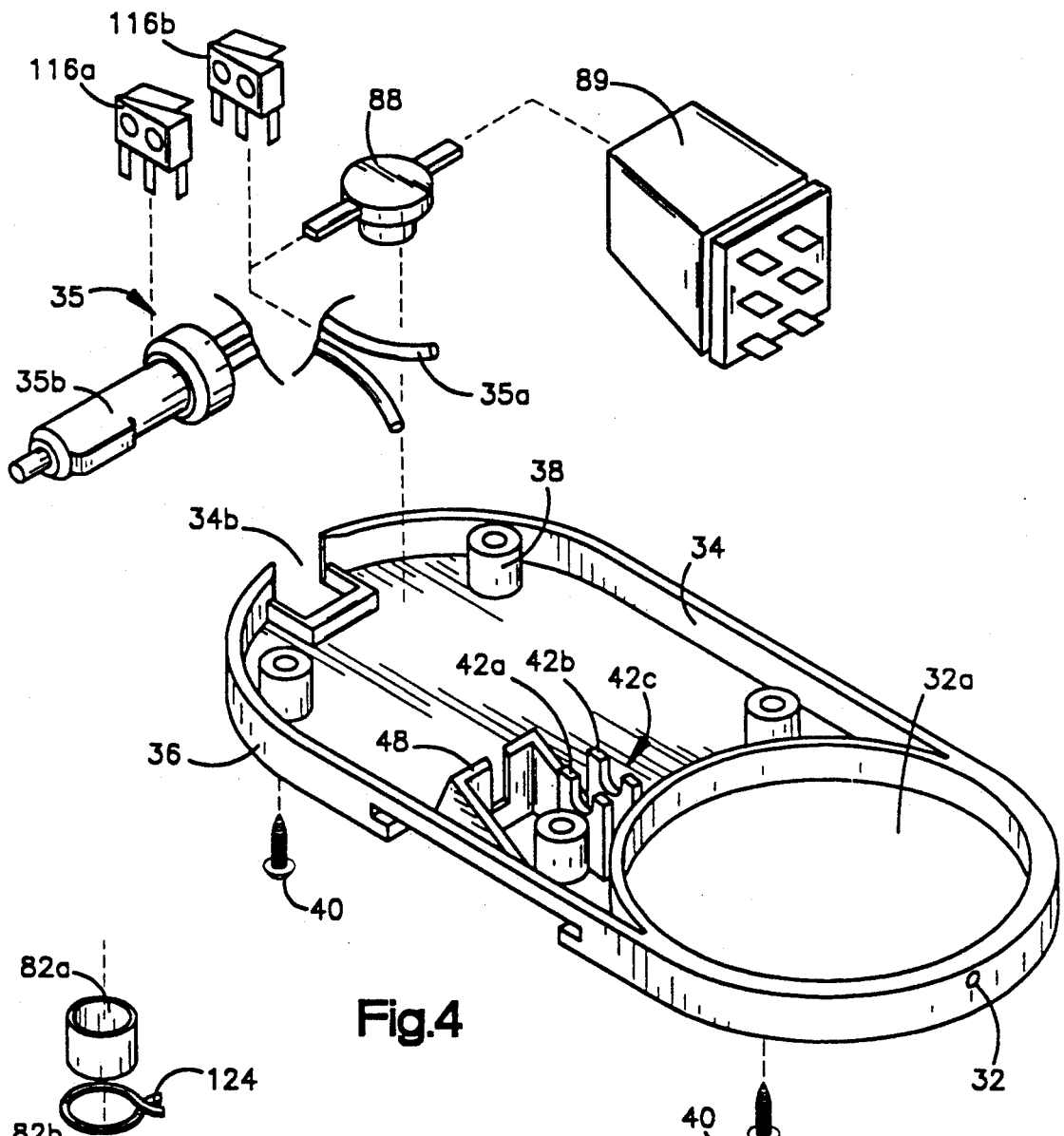
FIG. 4 is a detail elevation of the upper surface of the coffee maker bottom, and further depicts the electrical connector, temperature sensitive device, switches and electromechanical relay.

The bottom 32 of the coffee maker shown in FIG. 3, FIG. 3A and FIG. 4, has an essentially elliptical shape, upper and lower surfaces and two ends, with a circular shaped recess 32A near a first end of the ellipse. The recess 32A is adapted for placement of a drip cup 104 therein. A wall 34 rises vertically from the upper surface of the bottom 32. The wall may be recessed from the periphery of the bottom to form a protruding lip 36 to be grasped by the holder 30A and holder clamp 30B of the first embodiment. The wall 34 surrounds a substantial portion of the bottom 32 including about one-third of the circular recess 32A, preferably between 118° to 122° of the circular recess 32A, and there is an opening 34B in the wall at the second end of the elliptically shaped bottom, thereby allowing access for an electrical connector 35. The electrical connector 35 has two ends, the first end 35A connecting to the coffee maker and the second end 35B of the connector adapted to be plugged into the cigarette lighter of a motor vehicle for providing electricity to the coffee maker.

A plurality of grooved columns 38 are affixed to the flat surface of the bottom 32 to accept threaded screws 40 for the purpose of attaching the bottom 32 of the coffee maker body 12 to a measuring chamber 76, FIG. 7, which is equipped with opposing grooved columns 39 on the bottom thereof, whereby the threaded screws 40 may be tightened and the measuring chamber 76 removably fastened to the bottom 32 of the coffee maker 10.

The wall 34 interfits into a hollow main body 12 and the bottom 32 is preferably affixed to the main body 12 by threaded screws 41 through corresponding openings (not shown) in the bottom 32 and the main body sidewalls 12A. The main body 12, FIG. 11B, has a cylinder shaped recess 13 at one end thereof, which corresponds with the circular shaped recess 32A of the coffee maker bottom 32, which cylinder shaped recess 13 is made to receive a filter cup 94, a drinking cup 102 and a drip cup 104.

A pair of supports 42A, 42B rise vertically from the coffee maker bottom adjacent the wall of the circular recess 32A. The supports 42A, 42B have grooved portions 42C at the top thereof and are sufficiently spaced apart for receiving the wing portions 46A, 46B of a pivot arm 44, FIG. 7, thereby forming a support fulcrum and allowing the pivot arm 44 to rock or rotate as it rests in the grooves 42C of the vertical supports 42A,42B. A buttressed vertical frame 48 likewise rises vertically from the bottom 32 of the coffee maker for the purpose of receiving and stabilizing an electromechanical relay or other electronic switch means 89, FIG. 4, having dimension slightly less than that of the buttressed vertical frame 48.

In the preferred embodiment, FIG. 2A, a centralized hemispherical depression 60 is formed in the leveling plate 31A having a centered aperture 62 whereby the leveling plate 31A can be fitted into and rotatably mounted upon the corresponding hemispherical depression 24 in the mounting base 14. The aperture 62 of the leveling plate 30 coincides with a similarly centralized aperture 26 in a base 14. However, the aperture of the leveling plate 31A is, preferably, somewhat larger than the corresponding aperture 26 of the base 14, so that when the corresponding hemispheres, 60 of the and 24 of the base leveling plate 31A and 24 of the base, are positioned together by means of a bolt 28 insertable through said centralized apertures 26,62, which bolt 28 is held in place with a washer 28A and wing nut 28B, the leveling plate 31A may be rotated somewhat in relation to the base 14 to level the coffee maker before the wing nut 28B is tightened.

In FIG. 6, there is shown a water reservoir 70, having a volume between one cup or other single portion to about twenty cups, more preferably between three to seven cups, more preferably a volume of five cups, and the reservoir can have any shape which is adapted to be inserted and removed from within the main body 12 of the coffee maker. A reservoir cap 72 is provided for opening and resealing the water reservoir 70 and there is a reservoir handle 74 to expedite removal and reinsertion of the water reservoir 70 within the coffee maker's main body 12.

As depicted in FIG. 6 and FIG. 7, the water reservoir 70 is positioned above a measuring chamber 76 and rests upon a reservoir seat 78 which is between the reservoir 70 and a measuring chamber 76. The water reservoir 70 communicates with the measuring chamber 76 through a reservoir valve 80 which is held in place by the reservoir seat 78 so that water moves from the reservoir 70, passes the reservoir valve 80 and into the measuring chamber 76. A pushrod 92 communicates with the reservoir valve 80 at a first end and further communicates with a rotatable pivot arm 44 at the second end of the pushrod 92.

The device further contains means for timing water flow from the reservoir 70 to a measuring chamber 76, which means for timing is discussed more fully below. The measuring chamber 76 has smaller capacity than the reservoir 70, that volume being equal to a cup or single portion of a brewed beverage.

Figure 5:
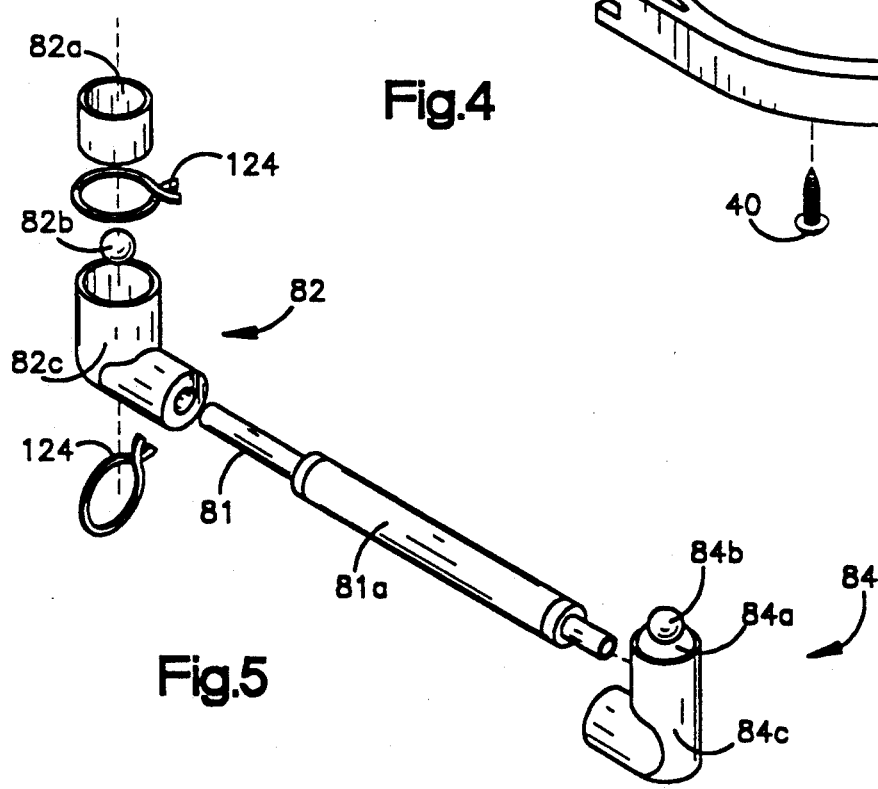
FIG. 5 depicts the communication between the heater tube and check valves.

The measuring chamber 76 further connects with a heater tube 81 through a first check valve 82, FIG. 5. When the water in the heater tube 81 is heated, it is then delivered through a second check valve 84 up a hot water tube 86, and the heater tube 81 continues to heat until a temperature sensitive device 88, which is associated with the heater tube 81, reaches temperatures that cause the temperature sensitive device 88 associated with the heater tube to break electrical continuity to the heater circuit and a Light Emitting Diode, LED, 90, and when the LED or button light 90 goes off, that alerts the user of the end of the brewing cycle. The temperature sensitive device 88 may be electronic, such as a thermistor, or electromechanical, such as a thermostat.

Water flows by gravity from the water reservoir 70 into the measuring chamber 76 only when the reservoir valve 80 is open. That valve 80 is opened by upward movement of the pushrod 92 against the reservoir valve 80, displacing the valve upwardly. Opening of the reservoir valve 80 is timed to allow waterflow substantially equal to a cup or other single portion of a brewed beverage, preferably between 5 to 7.5 ounces, more preferably about 6.5 to 7 ounces of water or other liquid, to flow from the reservoir 70 to measuring chamber 76. And the capacity of the measuring chamber 76 is limited to that volume, i.e., between 5 to 7.5 ounces.

The coffee maker 10 further incorporates a filter cup 94 designed to hold a prepackaged filter (not shown) containing beverage precursor particles. The filter cup 94 has an open top 94A and an open bottom 94B and, typically, a lip portion 94C surrounding the open top 94A of the filter cup 94. A shoulder portion 96 projects inward on the interior of the filter cup 94 nearby the open bottom which shoulder is adapted to support the prepackaged filter. The filter cup, shown in FIG. 8, is further provided with a curved flange 98 rising above the lip 94C, and the flange 98 extends contiguous with the lip about 180° around the open top 94A of the filter cup 94.

Figure 13:
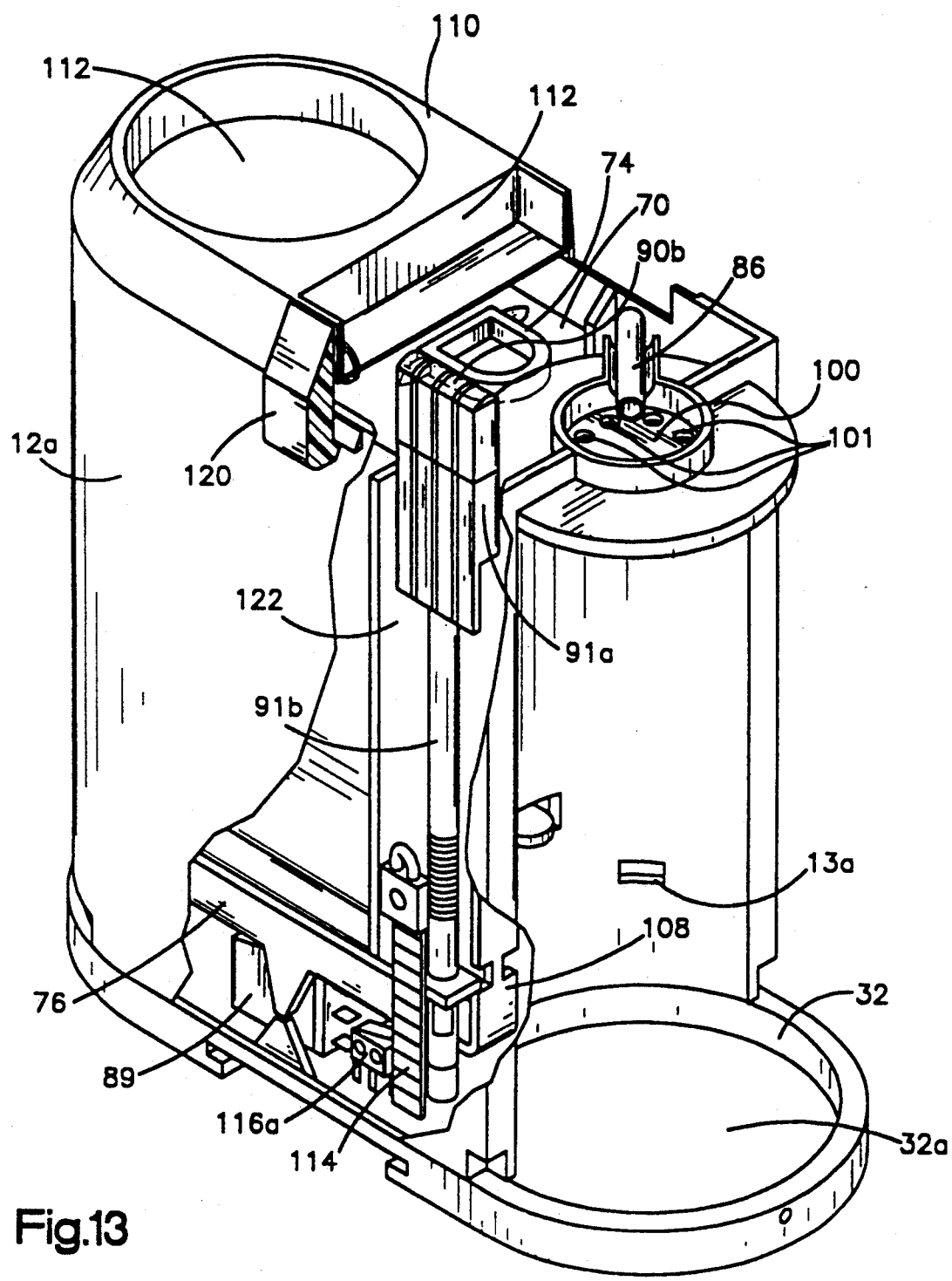
FIG. 13 is a partial three-quarter sectional view of the coffee maker depicting the apparatus in assembled array.

A flattened circular plate with perforations throughout its surface forms a showerhead configuration 100, FIG. 11A and FIG. 13 to project from the main body 12 above the cylinder shaped recess 13. The showerhead configuration is positioned near the top of the main body 12, above the cylinder shaped recess 13 at one end of the main body 12 of the coffee maker and, also, directly above a recessed portion 32A of the coffee maker bottom 32. This flattened circular showerhead configuration 100 interfits with the curved flange 98 around a substantial portion of the filter cup 94. Thus, the open top 94A of the filter cup 94 is removably retained directly below the showerhead configuration 100 in position to receive hot water from that source.

The filter cup 94 must be easily removable to expedite repetitive insertion of a prepackaged filter (not shown) therein and repositioning under the showerhead configuration 100.

A drip cup 104, FIG. 10, is provided and adapted to be insertable into a recess 32A in the coffee maker bottom 32 a sufficient distance below the filter cup 94 to allow positioning a drinking cup 102, FIG. 9, between filter cup 94 and drip cup 104. And the drinking cup 102 with an anti-splash lid 106 is insertable alongside the coffee maker in position above the drip cup 104 and below the filter cup 94.

Figure 11:
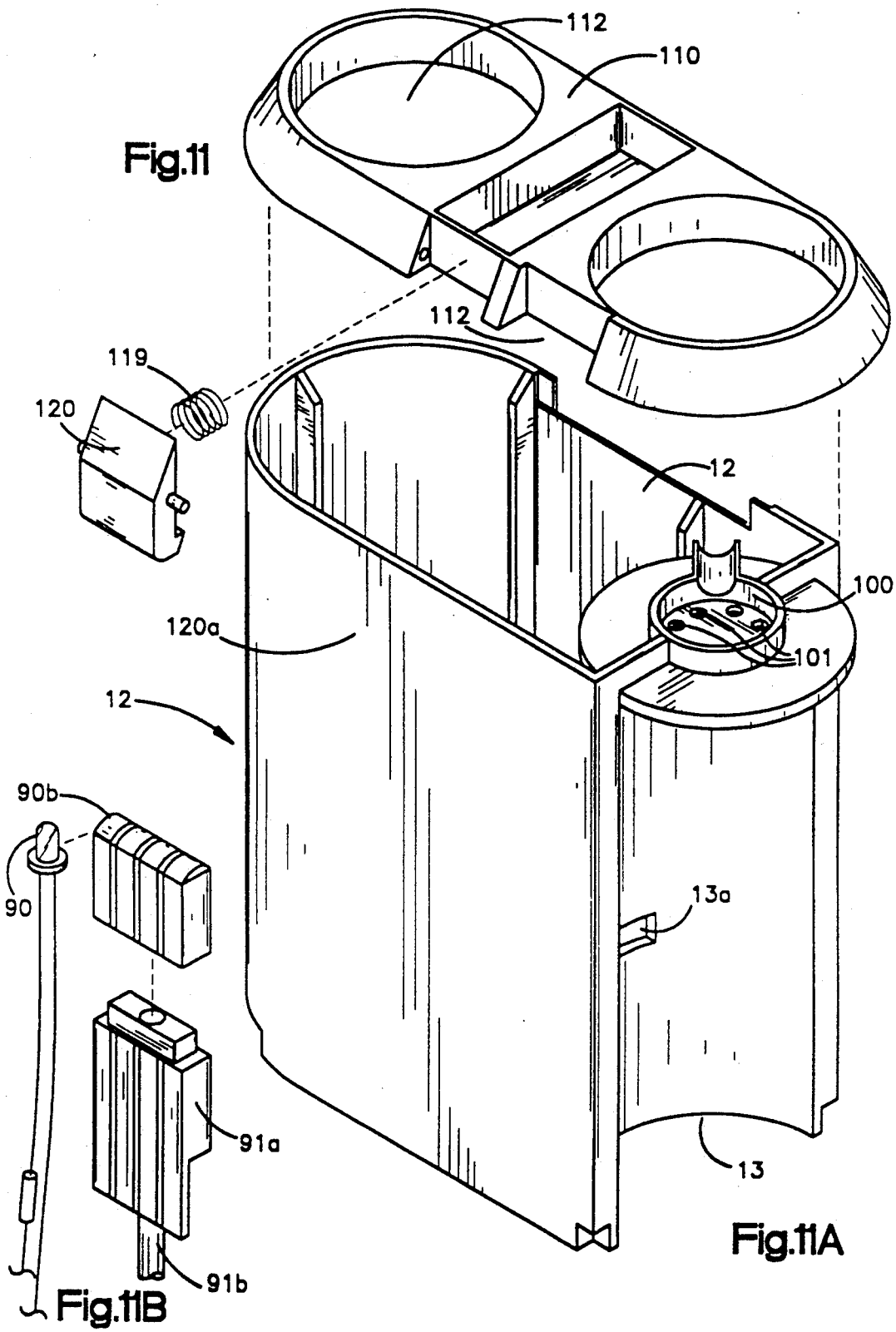
FIG. 11 is an elevational view of the main body and cover of the coffee maker.
Figure 12:
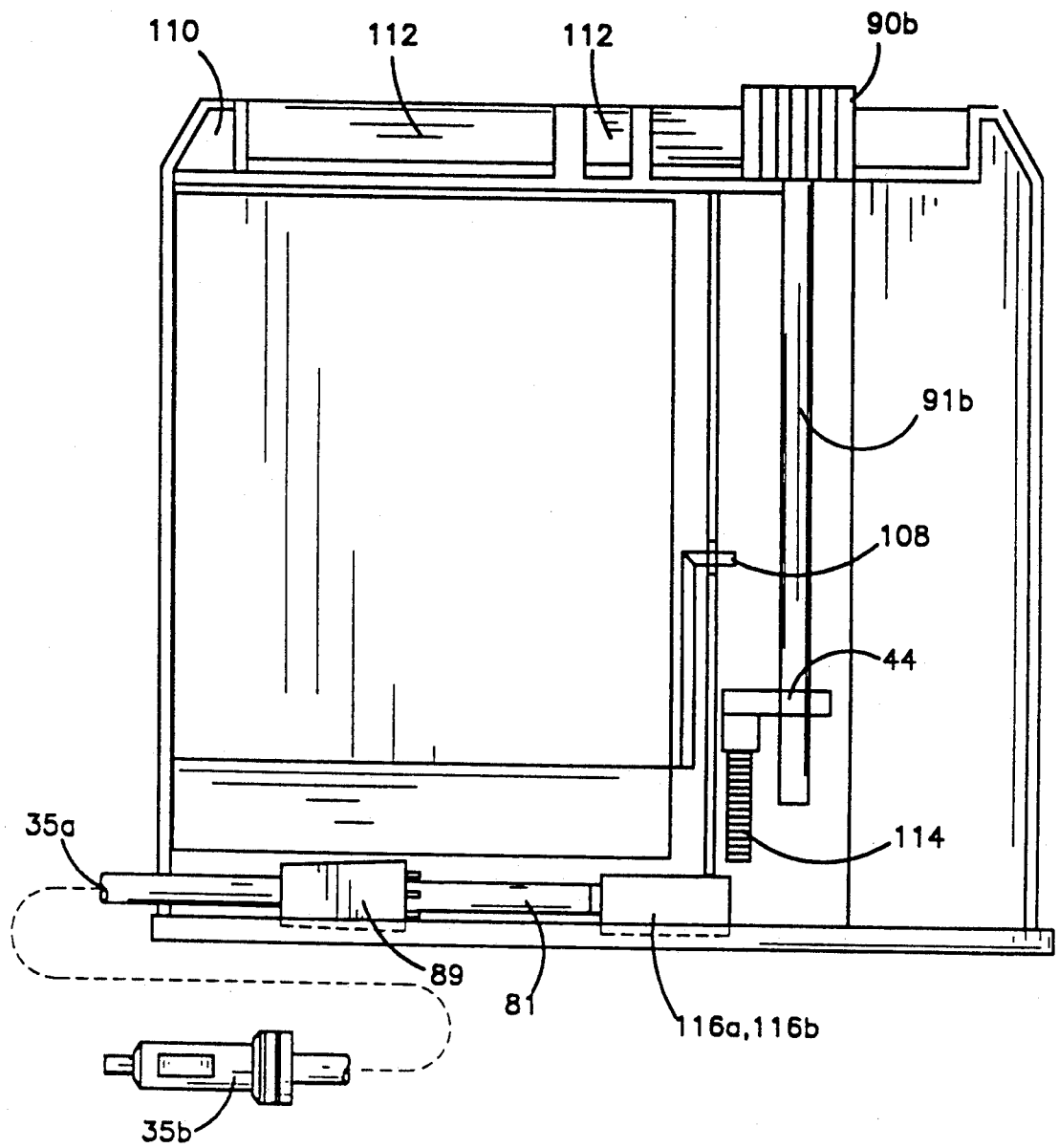
FIG. 12 is a side plan view in partially diagrammatic form indicating mechanical and electrical elements which enable the coffee maker to operate.

Referring to FIG. 12, there is shown a movable lockout lever 108 which is positioned so that it extends through an aperture 13A in the main body 12 and into the cylinder shaped recess 13 at one end of the main body 12 of the coffee maker 10. The lockout lever 108 is located at a level where the drinking cup 102 would be insertable in the cylinder shaped recess 13. The lockout lever 108 may be mounted so that it is rotatably or slidably movable when the drinking cup 102 is inserted in position between the filter cup 94 and drip cup 104. The drinking cup contacts the movable lockout lever 108 allowing a button light cover 90B, FIG. 11B, to be pressed downward for activating the brewing cycle. Thus, the brewing cycle will not be commenced unless the drinking cup 102 is oriented in proper position against the main body 12 of the coffee maker 10. Meanwhile, at the start of the brewing cycle, the button light cover 90B is pushed down which causes a button body 91A and a connected actuator stem 91B to push down on a first end of a pivot arm 44 allowing a bimetal fill latch 114, which is normally biased against a side of the pivot arm adjacent the first end thereof, to engage the first end of the pivot arm 44. At the same time, the lowered first end of the pivot arm closes electrical switches 116A,116B which are normally open, to allow electrical current to flow to an electronic switch means 89, LED display 90, fill latch 114 and heater tube 81. The electronic switch means may be an electromechanical relay or other means such as switching and timing.

The elongated, cylindrical heater tube 81 is provided with surrounding insulation 81A. The heater tube 81 is installed within, and stabilized in position upon the coffee maker bottom 32. The first end of the heater tube is adapted to couple with a first check valve 82, comprised of a check valve seal 82A, check valve ball 82B and check valve body 82C. The second end of the heater tube is coupled with a second check valve also comprising a check valve seal 84A, check valve ball 84B and check valve 84C. The ends of the heater tube are preferably fastened to the check valves by steel clamps 124.

In the first check valve body 82C, which is in the form of an L-shaped joint with a check valve seal 82A located at its upper end, and a check valve ball 82B, which is less dense than water and floats into position adjacent the seal after water flows by gravity from the measuring chamber to the heater tube 81. The check valve ball 82B may be comprised of polypropylene, polyethylene or other elastomeric material.

When the measuring chamber 76 is filled, water from the measuring chamber pushes the check valve ball 82B down and moves through the first check valve 82 into the heating tube 81. When the heating tube 81 is filled, it is closed off and this occurs when the check valve ball floats to position against the seal 82A to effectively prevent water backup. Water heated in the heater tube 81 expands forcing the heated water into a second check valve 84, and through check valve pieces comprising the check valve seal 84A, check valve ball 84B and check valve body 84C. Heat pump action force the ball away from the seal, thereby opening the check valve which, once again, ensures one-way flow of water through the system. The heated water then passes upward through a hot water tube 86, FIG. 6–FIG. 7, into the showerhead configuration 100, having a series of openings 101 therethrough over a broad area of the showerhead 100. Hot water disbursably flows through the showerhead 100 over a broad area and into the filter cup 94 holding the prepackaged filter (not shown).

Brewed coffee then flows by gravity through a center hole 106A in a drinking cup lid 106 and into a drinking cup 102. When all water in the measuring chamber 76 is heated and delivered up the hot water tube 86, the heater tube 81 continues to heat until a temperature sensitive device 88 associated with the heater tube 86 reaches temperatures that cause it to break electrical continuity to the heater circuit and LED. The light emitting diode, LED, 90 goes off to alert the user to the end of the cycle.

The drinking cup 102, equipped with a splash proof lid 106 can then be removed from position on the drip cup 104. The cover 106 of the drinking cup is slanted downward to a centralized opening 106A for receiving the brewed beverage from the filter cup 94. A curved projection 106B adjacent the interior side of the centralized opening effectively blocks that opening to prevent backsplash of beverage from the opening. A second opening 107, in the cover may be located at the point of a conical or cylinder shaped tube 107A emanating from a side of the cover to form a straw to effectively prevent splashing of the brewed beverage while the user is drinking from the cup 102. The drip cup 104 catches any excess liquid.

The coffee maker also includes a vent tube 118, FIG. 6–FIG. 7, which projects upward from the measuring chamber 76, for preventing back pressure in the measuring chamber 76.

A main body cover 110, FIG. 11, fits over the top of the coffee maker main body 12. The cover 110 may be repositionally attached by any means, but preferably the cover 110 is equipped with a hinge 120 and is hingably attached on one side of the coffee maker body and restrained in position with a spring 119 and biased snap lock mechanism 120A at one opposite sidewall 12A of the main body of the coffee maker. Alternatively, the hinge 120 may be affixed to a sidewall 12A of the main body 12 and the snap lock mechanism 120A positioned on a corresponding side of the cover.

The cover 110 has a plurality of recessed areas 112 some of which may have rounded configuration, and having appropriate dimensions and depth to hold the drinking cup 102 containing brewed beverage in stable position; and at least one of the plurality of recessed areas 112 has rectangular shape, appropriate design and depth for storage of prepackaged filters (not shown).

The main body cover 110 preferably has an elliptical shape with the rounded recessed areas 112 for holding a brewed cup of coffee at each of the narrow ends of the ellipse and the rectangular recessed portion for filters disposed essentially parallel to the shorter axis of the ellipse. An open slot 122 is defined to one side of the elliptical cover to allow passage therethrough of an LED 90, button body 91A, and a button body cover.

The button light cover 90B is formed over a button light 90 and button light body 91A. The button light body extends to form an elongated, vertical and cylindrical actuator stem 91B. The stem is operatively associated with the first end of the rotatable pivot arm 44. Since the actuator stem is spring biased to normally remain in upward position, the operatively associated first end of the pivot arm 44 is likewise normally in an upward position.

The second end of the pivot arm 44, which normally remains in downward position, articulates with the lower portion of a pushrod 92, and the upper end of the pushrod 92 communicates with the reservoir valve 80.

A push down on the button light cover, 90B, FIG. 13, ultimately results in rotation of the pivot arm 44 and elevation of the second end of the pivot arm 44 with further elevation of the articulated pushrod 92 communicating with the reservoir valve 80. This serves to open the reservoir valve 80 for a sufficient time to allow a cup or other single portion of liquids to flow from the water reservoir 70 to the measuring chamber 76.

A bimetal fill latch 114 is positioned to be normally biased against a side of the pivot arm 44 at the first end of the pivot arm. When the press down on the button light cover 90B occurs, the fill latch 114 springs from biased position to latch over and prevent movement of the pivot arm 44 at commencement of the brewing cycle. The fill latch 114 is an insulated bimetal strip around which there is wrapped a resistance wire (not shown). The resistance wire may be comprised of nickel/chrome alloy or such other composition for resistance wires as is well known in the art. The two metallic pieces in the bimetal strip expand at different rates when heated.

As the brew cycle continues and the resistance wire is electrically heated, the increased temperature transferred to the bimetal strip causes that strip to bend away from latching position and the pivot arm 44 rotates to normal position with the first end up and second end of the pivot arm down. The pivot arm 44 is also operatively associated with a lockout lever 108 and push rod 92 held in place by a rubber or silicon seal 109.

The lockout lever 108 is situated so that a projecting portion thereof extends outside the main body 12 of the coffee maker 10, so that when the drinking cup 102 is inserted into position alongside the coffee maker it moves the lockout lever, thereby allowing the button light body 91A and associated actuator stem 91B to be pushed downward for commencing a brewing cycle.

The lockout lever 108 is a mechanical interlock for safety which, until it is moved by the drinking cup 102, prevents the button light cover 90B from being pressed downward for activation of the cycle. The system cannot be operative if the lockout lever 108 is not displaced by the drinking cup 102. Thus the brewing cycle cannot begin unless the drinking cup 102 is oriented in proper position alongside the coffee maker.

Prior to operation within a motor vehicle, the device must be anchored. The coffee maker is anchored prior to use by inserting the threaded, L-shaped carpet anchors 18 into the floor or other surface of a motor vehicle. The carpet anchors 18 are then threadably fastened to the base 14. The coffee maker bottom 32 is inserted into the adjustable holder 30 and clamped between the first holder part 30A and second clamping part 30B.

In the preferred embodiment wherein the holder is comprised of a leveling plate 31A, the leveling plate 31A is fitted into the grooved section 33 of the bottom 32 of the coffeemaker and affixed in position with semicircular latch 33E.

The holder 30 or leveling plate 31A is then leveled in relation to the base 14 and then tightened against the base 14 by tightening the bolt 28, with washer 28A and wing nut 28B. The water reservoir 70 is filled and the cap 72 replaced, whereupon the reservoir is put in the coffee maker and the main body cover 110 closed.

After a prepackaged filter (not shown) is inserted, the filter cup 94 is positioned under the showerhead 100. The drip cup 104 is placed in the recess 32A of the coffee maker bottom 32. At this point the splashproof lid 106 is inserted upon the drinking cup 102 and the assembled drinking cup 102 is placed upon the drip cup 104. The proper positioning of the drinking cup 102 against the coffee maker main body 12 causes the lockout lever 108 to move allowing the button light cover 90B to be pressed downward.

The brewing cycle begins by a push down on a button light cover 90B, which causes the button light body 91A and associated actuator stem 91B to push down on the first end of the rotatable pivot arm 44, thereby allowing the biased fill latch 114 to engage the pivot arm 44 and at the same time the pivot arm engages electrical switches 116A,116B which are normally open, closing those switches to allow electrical current to flow to an electromechanical relay 89 an Light Emitting Diode, LED 90, the fill latch 114 and the heater tube 81. The button light body 91A and associated stem 91B are spring loaded for returning to initial position when the push down pressure is released. The reservoir valve 80 is held open by the pushrod 92 a sufficient time for water flow from the reservoir to fill the measuring chamber 76, i.e., to allow approximately 6.5 to 7 ounces of water to fill the measuring chamber 76.

The heat generated by the resistance wire (not shown) surrounding a bimetal strip on the fill latch 114 works against the bimetal strip. The temperature sensitive fill latch 114 bends away from latched position against the pivot arm 44, thereby allowing rotation of the second end of the pivot arm 44 downward, and the pushrod 92 articulated with the pivot arm 44 moves down effectively closing the reservoir valve 80.

Water which flowed from the reservoir 70 to measuring chamber 76 and through the first check valve 82, having been heated by the heater tube 81 and delivered up the hot water tube 86 to shower head configuration disperses over the filter within the filter cup 94 to brew coffee or other beverage. The heater tube automatically shuts off when it heats to a temperature sufficient to cause an associated temperature sensitive device 88, which may be a thermistor or thermostat, to break the electrical circuit to heater tube 81, LED, and an electronic relay means 89 to end the brewing cycle. The electronic relay means may be an electromechanical relay, power transistor, or silicone controlled rectifier or other switching means known to those skilled in the art.

While alternative embodiments for the invention disclosed herein would be obvious to those skilled in the art, it must be appreciated that resorting to such modifications would not be a departure from the scope of the invention hereinafter claimed.

What is claimed is:

1. An improved in-car coffee maker having a base and a hollow main body, with a pivotal holder interconnecting said base and main body; and installed within said main body, a removable water reservoir; a measuring chamber positioned below and communicating with the reservoir for receiving a measured amount of water from said reservoir; a reservoir valve seated between the reservoir and measuring chamber; a heater tube for heating liquid; a control circuit including a control switch to control power supply to the coffee maker and to said heater tube; a thermostatically controlled shut-off means operatively connected to said control switch for operation of the same and shut off power to the coffee maker when the heater tube is at an excessive temperature; said control switch including a control device, a lever arm pivotally positioned in the coffee maker to contact said control device and close said control switch, and means operatively and electronically connected to said control switch to retain said lever arm and control switch closing position until temperature rise causes said shut-off means to be actuated; wherein the improvement comprises:

said base having apertures at the corners thereof and L-shaped carpet anchors, each anchor having a threaded leg portion and pointed foot portion adapted for insertion of the foot portion through carpeting in a motor vehicle, and thumb nuts adapted for securing said threaded leg portion of each carpet anchor tightly to the base;

said hollow main body having first and second openings, two sidewalls and two ends, a removable cover fitted in the first end, and a removable bottom, having first and second surfaces, fitted in the second end of said main body of the coffee maker;

said holder pivotally mounted on said base and adapted to secure said bottom of said coffee maker and allow pivoting and leveling said coffee maker in relation to said base;

said base further comprising a raised section toward a central portion of the base and a hemisphere shaped depression with a centralized aperture located in the depression of said raised section, said hemisphere shaped depression adapted to interfit with a corresponding hemisphere shaped depression of the holder having a corresponding aperture located centrally in said holder; and a threaded bolt insertable through said corresponding apertures and a wing nut threadably tightened on said bolt to frictionally tighten the holder against the base when the in-car coffee maker is pivoted to a level position.

2. The in-car coffee maker of claim 1, wherein the holder comprises a leveling plate, and a grooved section is formed on the second surface of the coffee maker bottom, said leveling plate adapted to slidably interfit into said grooved section formed;

said plate rotatably mounted on said base whereby the coffee maker body can be leveled in relation to the base;

a semicircular latch rotatably fastened to the coffee maker bottom adjacent said grooved section, said latch adapted to rotate to closed position by gravity for retaining the coffee maker bottom in position on said leveling plate; and, upon manual rotation of said latch, for slidably removing the coffee maker from said plate and base for use as a portable coffee maker device.

3. The in-car coffee maker described in claim 2, wherein said removable water reservoir has a first opening at the top of said reservoir for receiving water, a cap to close and reseal said opening, a second opening at the bottom of said reservoir, a reservoir valve to control liquid flow from said second opening of said reservoir, said reservoir valve held in place by a reservoir seat;

a measuring chamber having a volume substantially equal to a cup or single portion, said measuring chamber positioned below said reservoir within said main body;

a push rod having first and second ends and held in position by a reservoir seal, said first end in contact with said reservoir valve and said second end articulating a pivot arm pivotally mounted upon supports vertically projecting from said coffee maker bottom;

a resistance wire wrapped around an insulated bimetal strip to form a fill latch to engage said pivot arm at commencement of the brewing cycle; said bimetal strip being comprised of two metals each having a different rate of expansion when heated, and the bimetal strip positioned for bias against said pivot arm, such that said bimetal strip engages and latches with said pivot arm to actuate said push rod for opening said reservoir reservoir valve for a time sufficient for a volume of liquid substantially equal to a cup or other single portion to flow from said reservoir into said measuring chamber; and the bimetal strip adapted to bend away from said latching engagement with said pivot arm when heated by electric flow in said resistance wire.

4. The in-car coffee maker described in claim 3 above, wherein said heater tube has two ends, the first end communicating with the measuring chamber by means of a first check valve allowing one-way flow of water from measuring chamber to heater tube;

said second end of said heater tube connected to a second check valve adapted to prevent backflow of liquid into said heater tube.

5. The in-car coffee maker described in claim 4 above, wherein said heater tube is positioned below said measuring chamber and essentially parallel to said coffee maker bottom.

6. The in-car coffee maker described in claim 5 above, wherein the heater tube is between 3.5 to 5.5 inches long with an internal diameter of between 3/16 to ⅜ inch.

7. The in-car coffee maker described in claim 6 above, wherein a resistance wire is uniformly wound around said heater tube.

8. The in-car coffee maker described in claim 7 above, wherein said heater tube and surrounding resistance wire are further surrounded by a layer of insulating material.

9. The in-car coffee maker described in claim 8 above, further comprising a hot water tube interconnecting said second check valve and a filter cup having a brewing chamber, said hot water tube adapted for transporting said single portion of heated liquid by a heat pump action from said heater tube, through said second check valve, to said brewing chamber of said filter cup;

a means for dispersably contacting said single portion of heated water over the entire area of a prepackaged filter containing a beverage precursor positioned within said filter cup, said means for dispersably contacting comprises in combination:

a flattened circular plate having perforations throughout its surface to form a shower head configuration;

a filter cup having an open top and bottom;

an inward projecting shoulder portion adjacent the bottom of said filter cup to support the prepackaged filter containing beverage precursor particles;

a contiguous curved flange rising above a lip of said filter cup and extending less than 180° around said open top of said filter cup, said curved flange adapted to receive said flattened circular plate of said shower head configuration for removably retaining said open top of said filter cup directly under said shower head configuration;

a brewing chamber within said filter cup where said single portion of heated liquid dispersably contacts said prepackaged filter containing a beverage precursor over the entire area thereof to brew a single portion of a beverage.

10. The in-car coffee maker of claim 9 above, wherein said shut-off means comprises a temperature sensitive device and an electronic relay means associated with said heater tube, whereby increased temperature in the empty heater tube causes the temperature sensitive device to break electrical continuity to the heater circuit.

11. The in-car coffee maker of claim 10, further comprising a drinking cup for receiving said single portion of brewed beverage; and a splash guard associated with said drinking cup, said splash guard comprises a drinking cup cover slanted downward to a centralized opening for receiving the brewed beverage, said centralized opening having a curved projection adjacent the interior side of said opening effectively blocking said opening to prevent backsplash of beverage from said centralized opening; and, a second opening in said cover located at the point of a conical tube emanating from a side of said cover to form a simulated straw to effectively prevent splashing as the brewed beverage is consumed.

12. The in-car coffee maker of claim 11, further comprising a drip cup for receiving excess liquid from the brewing chamber after the drinking cup has been removed.

13. The in-car coffee maker of claim 12, further comprising a lockout lever having a projection outside the main body which projection is moved by contact with said drinking cup when the drinking cup is placed in position against the main body of the coffee maker; a button light cover and associated actuated contacting a rotatable pivot arm normally held in position by a bimetal fill latch, and movement of said lockout lever by said drinking cup allows said button light cover and actuator stem to be pushed down on said rotatable pivot arm allowing the fill latch to engage said pivot arm and close electric switches to commence a brewing cycle.

14. The in-car coffee maker of claim 13, further comprising a button light which remains on during the brewing cycle and goes off upon completion of the brewing cycle.

15. The in-car coffee maker of claim 14, wherein said single portion of brewed beverage flows by gravity from the brewing chamber to said drinking cup.

16. The in-car coffee maker of claim 15, wherein said cover further comprising a plurality of recessed areas adapted to hold a drinking cup containing a brewed beverage in stable position within a motor vehicle, and at least one of said plurality of recessed areas is adapted for storage of prepackaged filters containing a beverage precursor.

* * * * *